US008717978B2

(12) United States Patent
Zhao

(10) Patent No.: US 8,717,978 B2
(45) Date of Patent: May 6, 2014

(54) METHOD AND SYSTEM FOR IMPLEMENTING SELF-DISCOVERY OF NETWORK ELEMENT

(75) Inventor: Rui Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 84 days.

(21) Appl. No.: 13/583,629

(22) PCT Filed: Sep. 25, 2010

(86) PCT No.: PCT/CN2010/077264
§ 371 (c)(1),
(2), (4) Date: Sep. 8, 2012

(87) PCT Pub. No.: WO2011/140778
PCT Pub. Date: Nov. 17, 2011

(65) Prior Publication Data
US 2013/0003602 A1     Jan. 3, 2013

(30) Foreign Application Priority Data

May 13, 2010    (CN) .......................... 2010 1 0171170

(51) Int. Cl.
*H04Q 7/00*     (2006.01)
*H04Q 7/24*     (2006.01)

(52) U.S. Cl.
USPC .......................................... 370/328; 370/338

(58) Field of Classification Search
CPC ......... H04L 41/04; H04L 41/12; H04L 45/00;
            H04L 45/02; H04L 45/04; H04L 43/12;
         H04W 72/04; H04W 80/04; H04W 84/12;
         H04W 84/18; H04W 88/06; H04W 88/08;
                                         H04W 76/00
USPC ................................. 370/254, 255, 328, 338
See application file for complete search history.

(56) References Cited

U.S. PATENT DOCUMENTS 8,496,181 B2 *   7/2013   Wang ........................ 235/472.01
8,559,336 B2 *   10/2013   Calippe et al. ................ 370/254
(Continued)

FOREIGN PATENT DOCUMENTS

CN        101466105 A     6/2009
WO    2006019925 A1    2/2006

OTHER PUBLICATIONS

International Search Report on international application No. PCT/CN2010/077264, mailed on Feb. 24, 2011.
(Continued)

*Primary Examiner* — Hong Cho
(74) *Attorney, Agent, or Firm* — Oppedahl Patent Law Firm LLC

(57) ABSTRACT

A method and a system for implementing self-discovery of network element. The method includes that: layout data (containing identifier information and basic information) of a newly-established network element is imported into a network manager of the newly-established network element; after being powered on, the newly-established network element sends its identifier information to one or more adjacent network elements to request to find its own basic information; and the adjacent network element requests the network manager of the newly-established network element to find the basic information according to the identifier information, and returns the basic information found by the network manager of the newly-established network element and the identifier information of the newly-established network element to the newly-established network element. The disclosure avoids problems of complicated manual configuration and vulnerable, highly risky, and elaborated way of configuration with DHCP in implementation of self-discovery of network element in the related art.

33 Claims, 7 Drawing Sheets

(56) References Cited

U.S. PATENT DOCUMENTS

2006/0013125 A1   1/2006   Vasseur
2008/0219263 A1*  9/2008   Kumazawa et al. .......... 370/392
2010/0220630 A1*  9/2010   Kalika et al. ................. 370/254

OTHER PUBLICATIONS

English Translation of the Written Opinion of the International Search Authority in international application No. PCT/CN2010/077264, mailed on Feb. 24, 2011.

* cited by examiner

METHOD AND SYSTEM FOR IMPLEMENTING SELF-DISCOVERY OF NETWORK ELEMENT

TECHNICAL FIELD

The disclosure relates to a base station, and in particular to a method and a system for implementing self-discovery of network element.

BACKGROUND

Self-discovery of network element refers to that a network element discovers existence of the network element itself in a network in process of establishing a base station, where the base station is a physical description and the network element is an abstract description of the base station in the network while both refer to the same thing. Said existence mainly shows in that the network element obtains its own IP (Internet Protocol) address in the network and other parameters including an IP address of a gateway, a subnet mask, an IP address of a network manager and the like. The purpose of the self-discovery of network element is to enable the network manager to find the base station in the network and establish a connection with the base station.

At present, there are mainly two ways of self-discovery of network element.

One is to perform manually, by engineering personnel, a basic configuration at both a base station side and a network manager side, wherein parameters of the basic configuration may include: an IP address of a base station, an IP address of a gateway, a subnet mask, an IP address of a network manager, and other basic parameters needed for operation of the base station;

But the above way of implementing the self-discovery of network element has the following problems:

complicated configuration process: the basic configuration needs to be performed simultaneously at the base station side and the network manager side;

elaborate parameter configuration: all data configured at the base station side and the network manager side are based on layout data and needs to be put in manually; and the process is very troublesome when a large number of base stations has to be established; and error-prone configuration process: error-proof manual input of the parameters cannot be guaranteed in the configuration processes of the base station side and the network manager side; and a major failure may occur when configurations of a certain key parameter at the base station side and the network manager side are inconsistent.

The other way is to implement the self-discovery of network element by configuring a Dynamic Host Configuration Protocol (DHCP) server (including a multi-level DHCP), but the process of parameter configuration in such a way is rather complicated, where not only parameters of each network element have to be configured manually on the DHCP server, but the layout data also have to be imported into the network manager; if the DHCP server and the network manager are deployed separately (i.e., not at the same location), the configuration process involves travel or coordination between two locations; according to circumstance of a pilot office, the office is generally unwilling to turn on broadcast forwarding of a switch for fear of a broadcast storm; even if the office is willing to turn on the broadcast forwarding of the switch and a firewall does not screen a broadcast message either, in the case of co-operation and co-maintenance of devices of multiple manufacturers, there may still exist questions like how other manufacturers would use the DHCP configuration and whether the DHCP configuration is consistent or in contradiction, etc. It seems that the contradiction can be solved by formulating a regulation, but selection and use of the DHCP service is in fact highly individual and diverse and thus cannot be regulated in practice.

SUMMARY

In view of the above analysis, the disclosure aims to provide a method and a system for implementing self-discovery of network element so as to solve the problem of complicated configuration due to self-discovery of network element with manual configuration in the related art, as well as problems such as elaborate and contradicting configuration in self-discovery of network element by configuration of a DHCP server in the related art.

The objective of the disclosure is mainly achieved by the following technical solutions.

The disclosure provides a method for implementing self-discovery of network element, including:

step A: importing layout data of a newly-established network element to a network manager of the newly-established network element, wherein the layout data contains identifier information of the newly-established network element and basic information of the newly-established network element;

step B: sending, by the newly-established network element, after the newly-established network element is powered on, the identifier information of the newly-established network element to one or more adjacent network elements and requesting to find the basic information of the newly-established network element; and step C: requesting, by one adjacent network element of the one or more adjacent network elements, according to the identifier information of the newly-established network element, the network manager of the newly-established network element to find the basic information of the newly-established network element, and sending back to the newly-established network element the basic information of the newly-established network element found by the network manager of the newly-established network element together with the identifier information of the newly-established network element.

Moreover, the method may further include that:

storing, by the newly-established network element, the basic information of the newly-established network element sent from the adjacent network element and notifying the network manager of the newly-established network element of existence of the newly-established network element per se.

Furthermore, the step B may specifically include that:

sending, by the newly-established network element after the newly-established network element is powered on, the identifier information of the newly-established network element that is carried in a broadcast message, to the one or more adjacent network elements and requesting to find the basic information of the newly-established network element when the newly-established network element finds that there is neither an IP address of the newly-established network element nor an IP address of the network manager to which the newly-established network element belongs.

Furthermore, the step C may further include that:

requesting, by the network manager of the newly-established network element, an authentication center to perform identity verification on the newly-established network element, and finding the basic information of the newly-established network element after the newly-established network element passes the verification.

Furthermore, the step C may specifically include, when the adjacent network element and the newly-established network element are of a same standard, and an network manager of the adjacent network element and the network manager of the newly-established network element belong to a same subordinate network manager:

receiving, by the adjacent network element, the identifier information of the newly-established network element sent by the newly-established network element via radio, performing a finding operation in a subordinate network manager shared by the newly-established network element and the adjacent network element according to the identifier information of the newly-established network element, sending back to the newly-established network element via radio the found basic information of the newly-established network element together with the identifier information of the newly-established network element; or, the step C comprises, when the adjacent network element and the newly-established network element are of the same standard, and the network manager of the adjacent network element and the network manager of the newly-established network element do not belong to the same subordinate network manager but have a same superordinate network manager:

receiving, by the adjacent network element, the identifier information of the newly-established network element sent by the newly-established network element via radio, and requesting, sequentially via the network manager of the adjacent network element and via the superordinate network manager shared by the newly-established network element and the adjacent network element, the network manager of the newly-established network element to find the basic information of the newly-established network element according to the identifier information of the newly-established network element;

finding, by the network manager of the newly-established network element, the basic information of the newly-established network element according to the identifier information of the newly-established network element, and sending, sequentially via the superordinate network manager shared by the newly-established network element and the adjacent network element and via the network manager of the adjacent network element, back to the adjacent network element the found basic information of the newly-established network element; and sending, by the adjacent network element, back to the newly-established network element the found basic information of the newly-established network element together with the identifier information of the newly-established network element.

Furthermore, the step B may further include, when the adjacent network element and the newly-established network element are of different standards:

sending, by the newly-established network element, its standard information together with its identifier information to the adjacent network element.

Furthermore, the step C may specifically include that:

forwarding, by the adjacent network element, to the network manager of the adjacent network element the received identifier information and standard information of the newly-established network element sent by the newly-established network element via radio;

forwarding, sequentially by the network manager of the adjacent network element and by an superordinate network manager of the adjacent network element, the identifier information and standard information of the newly-established network element to an superordinate network manager of the newly-established network element when determining that the standard of the newly-established network element is incompatible according to the standard information of the newly-established network element;

forwarding, by the superordinate network manager of the newly-established network element, the identifier information of the newly-established network element to the network manager of the newly-established network element when determining that the standard of the newly-established network element is compatible according to the standard information of the newly-established network element;

locally finding, by the network manager of the newly-established network element, the basic information of the newly-established network element according to the identifier information of the newly-established network element, and forwarding, sequentially via the superordinate network manager of the newly-established network element, the superordinate network manager of the adjacent network element, and the network manager of the adjacent network element, the found basic information of the newly-established network element to the adjacent network element; and sending, by the adjacent network element via radio, back to the newly-established network element the basic information of the newly-established network element sent back by the network manager of the newly-established network element together with the identifier information of the newly-established network element.

Furthermore, the identifier information of the newly-established network element may include a CC board serial number of the newly-established network element or identity information of the newly-established network element.

The disclosure further provides a system for implementing self-discovery of network element, including: a network manager of a newly-established network element, the newly-established network element, and one or more adjacent network elements, wherein the network manager of the newly-established network element is configured to store beforehand layout data imported therein and find basic information of the newly-established network element according to a request from one adjacent network element of the one or more adjacent network elements, wherein the layout data contains identifier information of the newly-established network element and the basic information of the newly-established network element;

the newly-established network element is configured to send, after being powered on, the identifier information of the newly-established network element to the one or more adjacent network elements to request to find the basic information of the newly-established network element; and the adjacent network element is configured to request the network manager of the newly-established network element to find the basic information of the newly-established network element according to the identifier information of the newly-established network element, and send back to the newly-established network element the basic information of the newly-established network element found by the network manager of the newly-established network element together with the identifier information of the newly-established network element.

Furthermore, the newly-established network element may be further configured to store the basic information of the newly-established network element received from the adjacent network element and notify the network manager of the newly-established network element of existence of the newly-established network element per se.

Furthermore, the newly-established network element may be specifically configured to send, after being powered on, the identifier information of the newly-established network element carried in a broadcast message to the one or more adjacent network elements and request to find the basic information of the newly-established network element when determining that there is neither an IP address of the newly-established network element nor an IP address of the network manager to which the newly-established network element belongs.

Furthermore, the system may also include:

an authentication center configured to perform identity verification on the newly-established network element according to a request from the network manager of the newly-established network element and notify the network manager of the newly-established network element after the newly-established network element passes the verification.

Furthermore, when the adjacent network element and the newly-established network element are of a same standard, and a network manager of the adjacent network element and the network manager of the newly-established network element belong to a same subordinate network manager, the adjacent network element may be specifically configured to perform, after receiving the identifier information of the newly-established network element sent by the newly-established network element via radio, a finding operation in the network manager of the newly-established network element according to the identifier information of the newly-established network element, and send back to the newly-established network element via radio the found basic information of the newly-established network element together with the identifier information of the newly-established network element; or, when the adjacent network element and the newly-established network element are of the same standard, and the network manager of the adjacent network element and the network manager of the newly-established network element do not belong to the same subordinate network manager but have a same superordinate network manager, the system may further include the superordinate network manager shared by the newly-established network element and the adjacent network element, wherein the adjacent network element is specifically configured to request, sequentially via the network manager of the adjacent network element and via the superordinate network manager shared by the newly-established network element and the adjacent network element, the network manager of the newly-established network element to find the basic information of the newly-established network element according to the identifier information of the newly-established network element after receiving the identifier information of the newly-established network element sent by the newly-established network element via radio, and send back to the newly-established network element via radio the basic information of the newly-established network element sent back by the network manager of the newly-established network element together with the identifier information of the newly-established network element; and the network manager of the newly-established network element is specifically configured to send, after finding the basic information of the newly-established network element according to the identifier information of the newly-established network element, sequentially via the superordinate network manager and the network manager of the adjacent network element, back to the adjacent network element the found basic information of the newly-established network element.

Furthermore, when the adjacent network element and the newly-established network element are of different standards, the newly-established network element may be configured to send its own standard information together with its own identifier information to the adjacent network element.

Furthermore, when the adjacent network element and the newly-established network element are of different standards, the system may further include a superordinate network manager of the adjacent network element and a superordinate network manager of the newly-established network element, wherein the adjacent network element may be specifically configured to forward, after receiving the identifier information and the standard information of the newly-established network element sent by the newly-established network element via radio, the identifier information and the standard information of the newly-established network element to the network manager of the adjacent network element, and send back to the newly-established network element via radio the basic information of the newly-established network element sent by the network manager of the newly-established network element together with the identifier information of the newly-established network element;

the network manager of the adjacent network element and the superordinate network manager of the adjacent network element may be specifically configured to sequentially forward the identifier information and the standard information of the newly-established network element to the superordinate network manager of the newly-established network element when determining that the standard of the newly-established network element is incompatible according to the standard information of the newly-established network element;

the superordinate network manager of the newly-established network element may be configured to forward the identifier information of the newly-established network element to the network manager of the newly-established network element when determining that the standard of the newly-established network element is compatible according to the standard information of the newly-established network element; and the network manager of the newly-established network element may be specifically configured to locally find the basic information of the newly-established network element according to the identifier information of the newly-established network element, and forward, sequentially via the superordinate network manager of the newly-established network element, the superordinate network manager of the adjacent network element, and the network manager of the adjacent network element, the found basic information of the newly-established network element to the adjacent network element.

The disclosure has the following advantages:

the disclosure avoids the problem of the complicated configuration caused by self-discovery of network element with manual configuration in the related art and discards the elaborate way of configuration via DHCP which is both very vulnerable and highly risky.

DETAILED DESCRIPTION

The method of the disclosure will first be elaborated in conjunction with the drawings.

Figure 1:
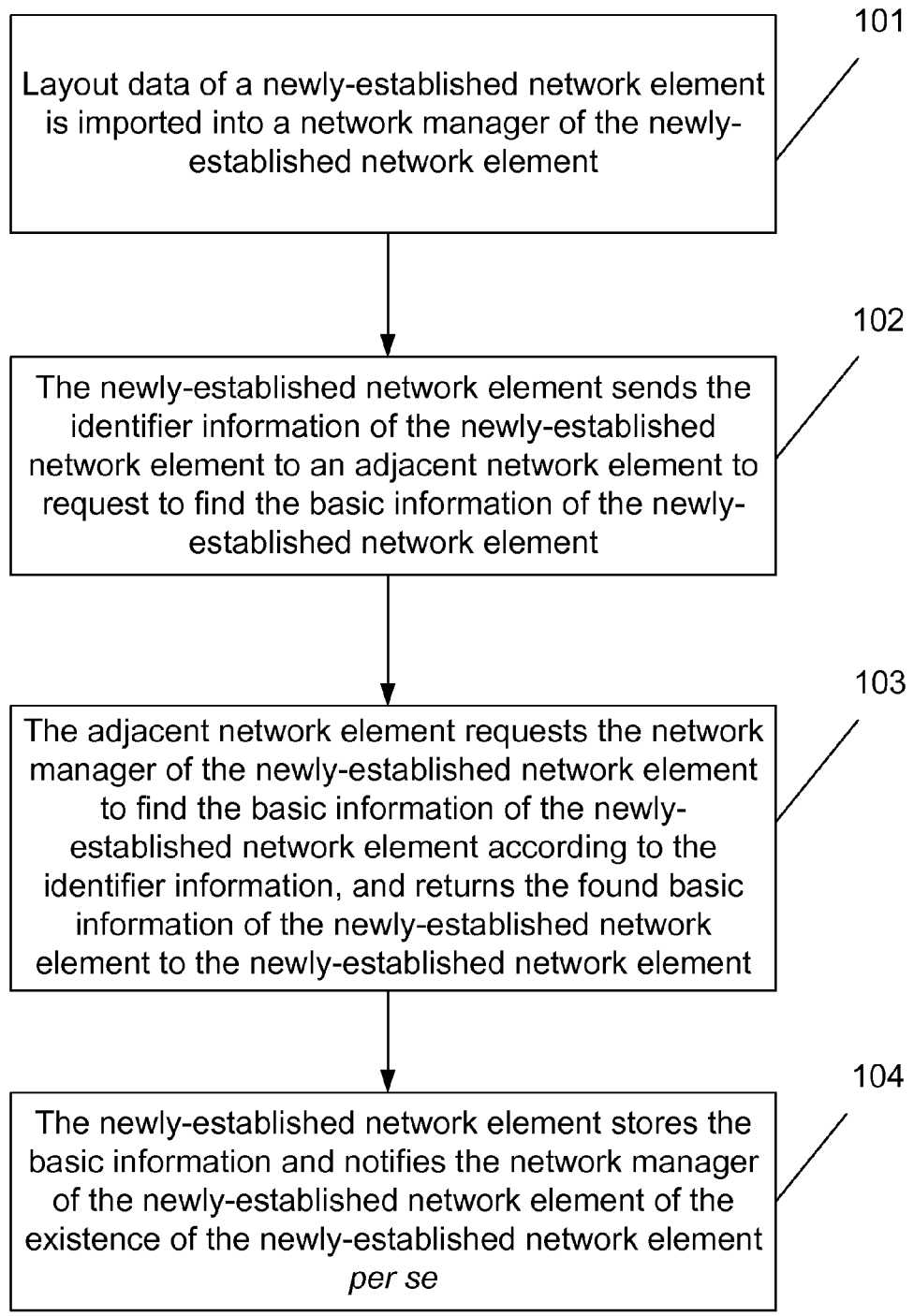
FIG. 1 is a main process diagram showing a method for implementing self-discovery of network element of the disclosure.

As shown in FIG. 1, the method for implementing self-discovery of network element may include that:

Step 101: layout data of a newly-established network element is imported into a network manager of the newly-established network element, wherein the layout data contains identifier information of the newly-established network element and basic information of the newly-established network element;

Step 102: after being powered on, the newly-established network element sends the identifier information of the newly-established network element to one or more adjacent network elements and request to find the basic information of the newly-established network element;

Step 103: the adjacent network element requests the network manager of the newly-established network element to find the basic information of the newly-established network element according to the identifier information of the newly-established network element, and returns to the newly-established network element the basic information of the newly-established network element found by the network manager of the newly-established network element together with the identifier information of the newly-established network element; and Step 104: the newly-established network element stores the basic information of the newly-established network element sent from the adjacent network element and notifies the network manager of the newly-established network element of the existence of the newly-established network element per se.

The method of the disclosure will be further described with two method embodiments hereinafter.

It should be noted that, there are generally multiple adjacent network elements, and of course there may be only one adjacent network element or one of the adjacent network elements may be specified; therefore, the newly-established network element may either request, via a unicast message, one of the adjacent network elements to perform a finding operation, or request, via a broadcast message, multiple adjacent network elements to perform a finding operation simultaneously; in addition, the adjacent network element and the newly-established network element may be in the same standard or in different standards; and under the same standard, a subordinate network manager of the adjacent network element may either be the same as or be different from that of the newly-established network element, but both the network elements have the same superordinate network manager.

First Method Embodiment the first method embodiment mainly describes a scenario of a self-discovery process of a Long Term Evolution (LTE) network element with existence of an adjacent LTE network element of the same standard, where for convenience of description, the LTE network element that needs to be self-discovered is assumed to be a network element A and the existing adjacent LTE network element be a network element B.

Figure 2:
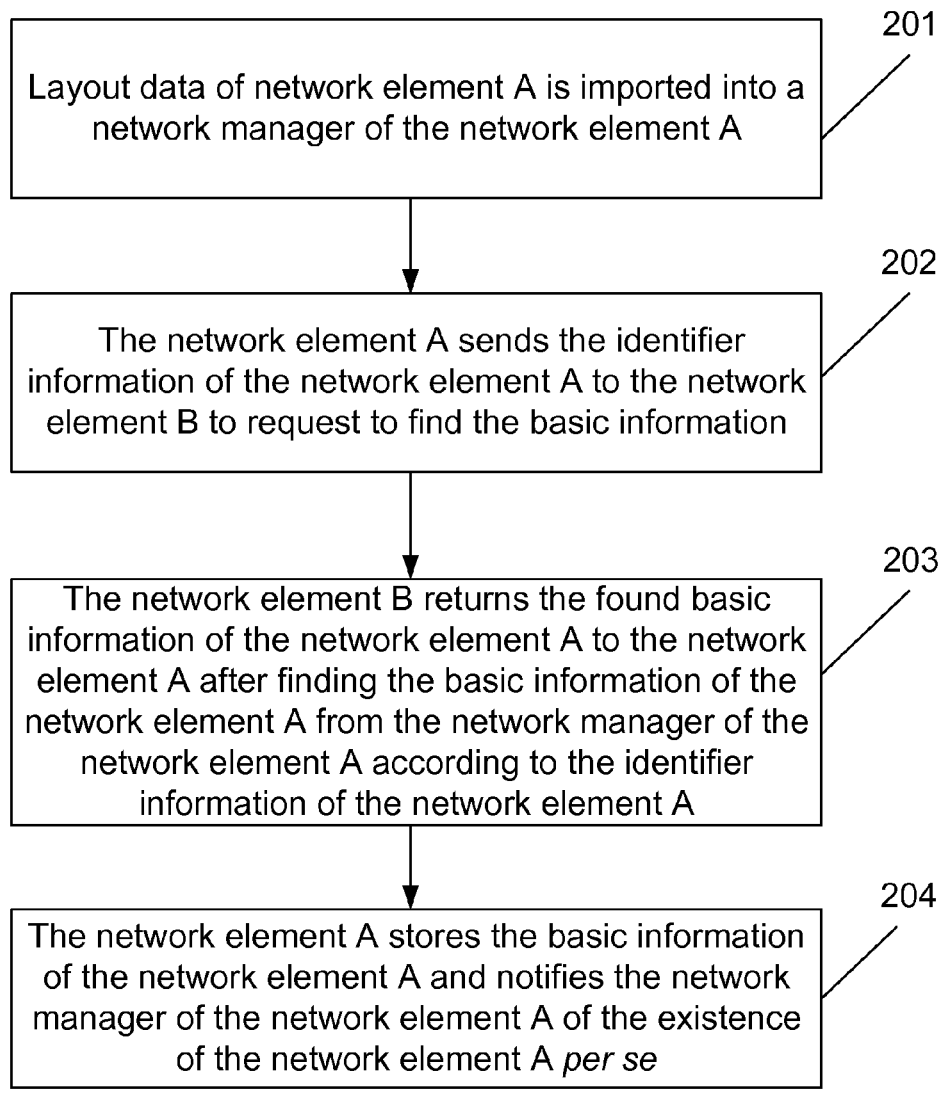
FIG. 2 is a process diagram showing a method of a first method embodiment of the disclosure.
Figure 3:
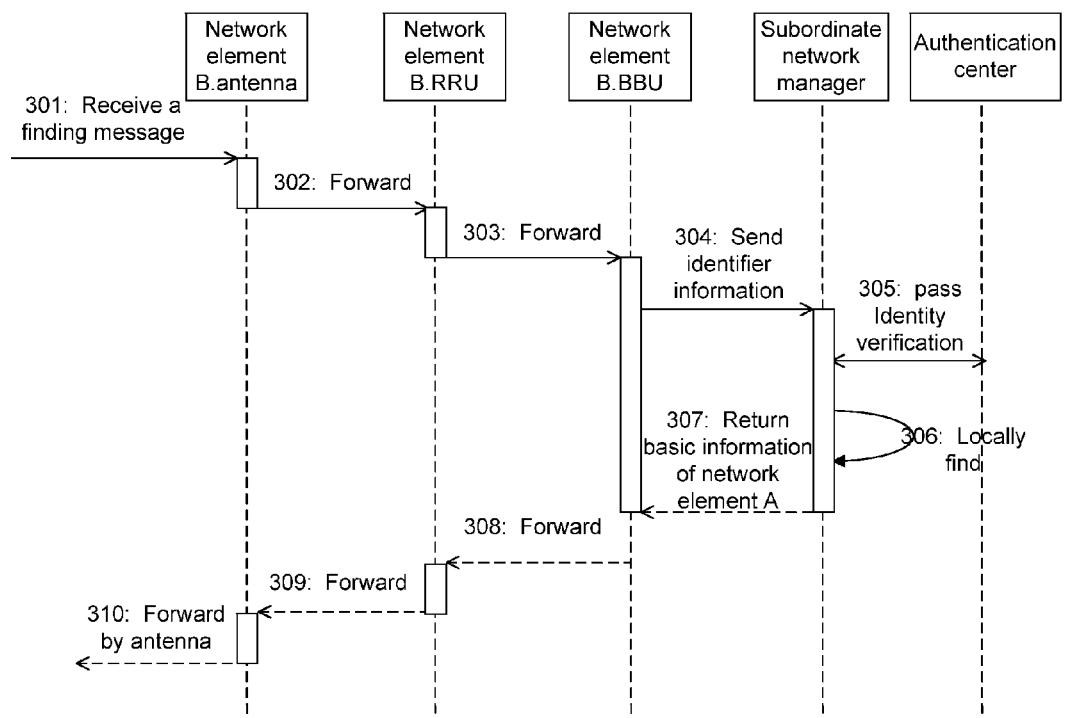
FIG. 3 is a process diagram showing a way in which a network element B finds and feeds back basic information of a network element A in the method of the first method embodiment of the disclosure.
Figure 4:
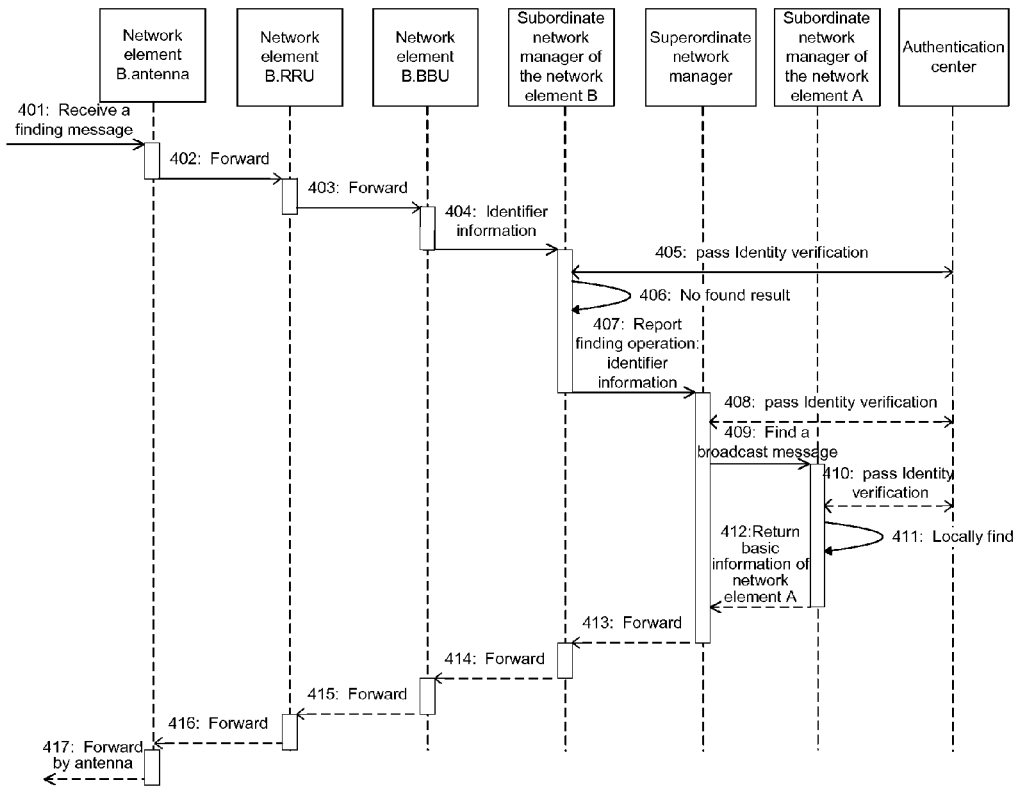
FIG. 4 is a process diagram showing another way in which the network element B finds and feeds back the basic information of the network element A in the method of the first method embodiment of the disclosure.
Figure 5:
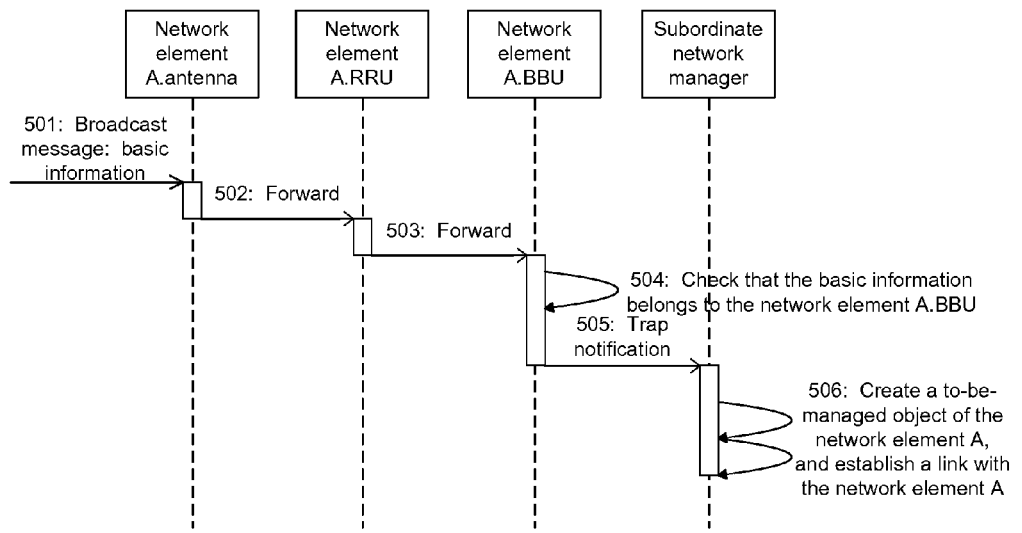
FIG. 5 is a process diagram showing processing by the network element A the received basic information in the method of the first method embodiment of the disclosure.

As shown in FIG. 2, the self-discovery process of the LTE network element may include that:

Step 201: layout data of the network element A is imported into a network manager of the network element A; specifically, the layout data of the network element A is imported into a subordinate network manager of the network element A, wherein the layout data is generated by a network layout tool and includes at least the following fields: identifier information (a CC board (i.e., master control board) serial number or identity information of the network element), an Identity (ID) of the network element, an Internet Protocol (IP) address of the network element, an IP address of a gateway, a subnet mask, and other configuration parameters;

Step 202: the network element A initiates a finding request after being powered on; specifically, the network element A sends, after being powered on and when discovering that there is neither an IP address of the network element A nor an IP address of the network manager to which the newly-established network element belongs, a broadcast message to the network element B by an antenna of the network element A to request to find basic information of the network element A, wherein the broadcast message carries the identifier information (the CC board serial number or the identity information of the network element) of the network element A; i.e., a finding message for finding the basic information of the network element A is sent, wherein the finding message carries the identifier information (the CC board serial number or the identity information of the network element) of the network element A;

Step 203: the network element B returns, after receiving the broadcast message that carries the identifier information (the CC board serial number or the identity information of the network element) of the network element A and after finding the basic information of the network element A from the network manager of the network element A according to the identifier information (the CC board serial number or the identity information of the network element) of the network element A, the basic information of the network element A to the network element A, where the specific process is shown in FIG. 3 and FIG. 4 and will be elaborated hereinafter; and Step 204: the network element A stores, after receiving the basic information of the network element A returned by the network element B, the basic information of the network element A and notifies the network manager of the network element A of the existence of the network element A per se, where the specific process is shown in FIG. 5 and will be elaborated hereinafter.

FIG. 3 is a process diagram showing Step 203, i.e., a way in which the network element B finds and feeds back the basic information of the network element A, wherein when a subordinate network manager with imported layout data of the network element A (hereafter referred to as a network manager of the network element A) and a subordinate network manager of the network element B (hereafter referred to as a network manager of the network element B) are the same subordinate network manager, finding and feeding back, by the network element B, the basic information of the network element A may specifically include that:

Step 301: an antenna of the network element B (a network element B.antenna) receives a finding message for finding the basic information of the network element A, wherein the finding message carries the identifier information (the CC board serial number or the identity information of the network element) of the network element A;

Step 302: the antenna of the network element B sends the finding message to a Radio Remote Unit (RRU) of the network element B (a network element B.RRU);

Step 303: the network element B.RRU forwards the finding message to a Base Band Unit (BBU) of the network element B (a network element B.BBU);

Step 304: the network element B.BBU sends the identifier information (the CC board serial number or the identity information of the network element) of the network element A to the subordinate network manager;

Step 305: the subordinate network manager initiates an identity verification of the network element A with an authentication center; the next step is executed if the network element A passes the verification; otherwise the process is stopped; wherein the authentication center may be deployed in the network manager or deployed separately;

Step 306: when the network manager of the network element A and that of the network element B belong to the same subordinate network manager, the subordinate network manager locally finds the basic information of the network element A according to the identifier information (CC board serial number or identity information of the network element) of the network element A, wherein the basic information includes: ID of the network element, an IP address of the network element, an IP address of the gateway, subnet mask, and an IP address of the network manager;

Step 307: the subordinate network manager returns, after finding the basic information of the network element A from the imported layout data, the basic information of the network element A to the network element B.BBU;

Step 308: the network element B.BBU sends to the network element B.RRU the identifier information (the CC board serial number or the identity information of the network element) and the basic information of the network element A;

Step 309: the network element B.RRU forwards the identifier information (the CC board serial number or the identity information of the network element) and the basic information of the network element A to the antenna of the network element B; and Step 310: the antenna of the network element B sends a broadcast message via radio, wherein the broadcast message carries the identifier information (the CC board serial number or the identity information of the network element) and the basic information of the network element A.

FIG. 4 is a process diagram showing Step 203, i.e., another way in which the network element B finds and feeds back the basic information of the network element A, wherein when the network element A and the network element B belong to different subordinate network managers but have the same superordinate network manager, finding and feeding back, by the network element B, the basic information of the network element A may specifically include that:

Step 401: the antenna of the network element B receives a broadcast message carrying the identifier information (the CC board serial number or the identity information of the network element) of the network element A;

Step 402: the antenna of the network element B sends the broadcast message to the network element B.RRU;

Step 403: the network element B.RRU forwards the broadcast message to the network element B.BBU;

Step 404: the network element B.BBU sends the identifier information (the CC board serial number or the identity information of the network element) of the network element A to the subordinate network manager of the network element B;

Step 405: the network manager of the network element B initiates the identity verification of the network element A with the authentication center; the next step is executed if the network element A passes the verification; otherwise the process is stopped;

Step 406: the network manager of the network element B fails to locally find the basic information of the network element A;

Step 407: the finding operation (which carries the identifier information (the CC board serial number or the identity information of the network element) of the network element A) is reported to the common superordinate network manager of the network element A and the network element B;

Step 408: the superordinate network manager initiates the identity verification of the network element A with the authentication center; the next step is executed if the network element A passes the verification; otherwise the process is stopped;

Step 409: the superordinate network manager initiates a finding broadcast message towards all the subordinate network managers;

Step 410: each subordinate network manager initiates the identity verification of the network element A with the authentication center; the next step is executed if the network element A passes the verification; otherwise the process is stopped;

Step 411: each subordinate network manager locally finds the basic information of the network element A according to the identifier information of the network element A;

Step 412: the subordinate network manager of the network element A returns the found basic information of the network element A to the superordinate network manager;

Step 413: the superordinate network manager forwards the basic information of the network element A to the subordinate network manager of the network element B;

Step 414: the subordinate network manager of the network element B forwards the basic information of the network element A to the network element B.BBU;

Step 415: the network element B.BBU forwards the identifier information (the CC board serial number or the identity information of the network element) and the basic information of the network element A to the network element B.RRU;

Step 416: the network element B.RRU forwards the identifier information (the CC board serial number or the identity information of the network element) and the basic information of the network element A to the antenna of the network element B; and Step 417: the antenna of the network element B sends a broadcast message via radio, wherein the broadcast message carries the identifier information (the CC board serial number or the identity information of the network element) and the basic information of the network element A.

FIG. 5 is a process diagram showing Step 204, i.e., the newly-established network element processes the received basic information, wherein the process may specifically include that:

Step 501: the antenna of the network element A receives a broadcast message sent by the antenna of the network element B, wherein the broadcast message carries the identifier information (the CC board serial number or the identity information of the network element) and the basic information of the network element A;

Step 502: the antenna of the network element A forwards the identifier information (the CC board serial number or the identity information of the network element) and the basic information of the network element A to the network element A.RRU;

Step 503: the network element A.RRU forwards the identifier information (the CC board serial number or the identity information of the network element) and the basic information of the network element A to the network element A.BBU;

Step 504: the network element A.BBU checks whether the identifier information (the CC board serial number or the identity information of the network element) in the message is that of the network element A.BBU per se, if so, the network element A.BBU writes the basic information of the network element A in the message into a memory or a database;

Step 505: the network element A.BBU sends a Trap notice to the IP address of the network manager of the network element A to notify the network manager of the network element A of an existence state of the network element A, wherein the content of the Trap notice includes the identifier information (the CC board serial number or the identity information of the network element), an ID of the network element, an IP address of the network element, an IP address of an gateway, and a subnet mask; and Step 506: the network manager of the network element A receives the Trap notice of the network element A, creates a to-be-managed object of the network element A according to the imported layout data, and then initiates management of the network element A, wherein the content of the management includes link establishment, configuration synchronization, and software download.

Second Method Embodiment the second method embodiment mainly describes a scenario of a self-discovery process of a LTE network element without any LTE adjacent network element but with existence of an adjacent network element of another standard; what is different from the first embodiment is that parameters of a finding command here should also include standard information of the newly-established network element besides the existing identifier information (the CC board serial number or the identity information of the network element). Here, for convenience of description, the LTE network element that needs to be self-discovered is assumed to be a network element A and the existing adjacent LTE network element of the other standard be a network element B.

Figure 6:
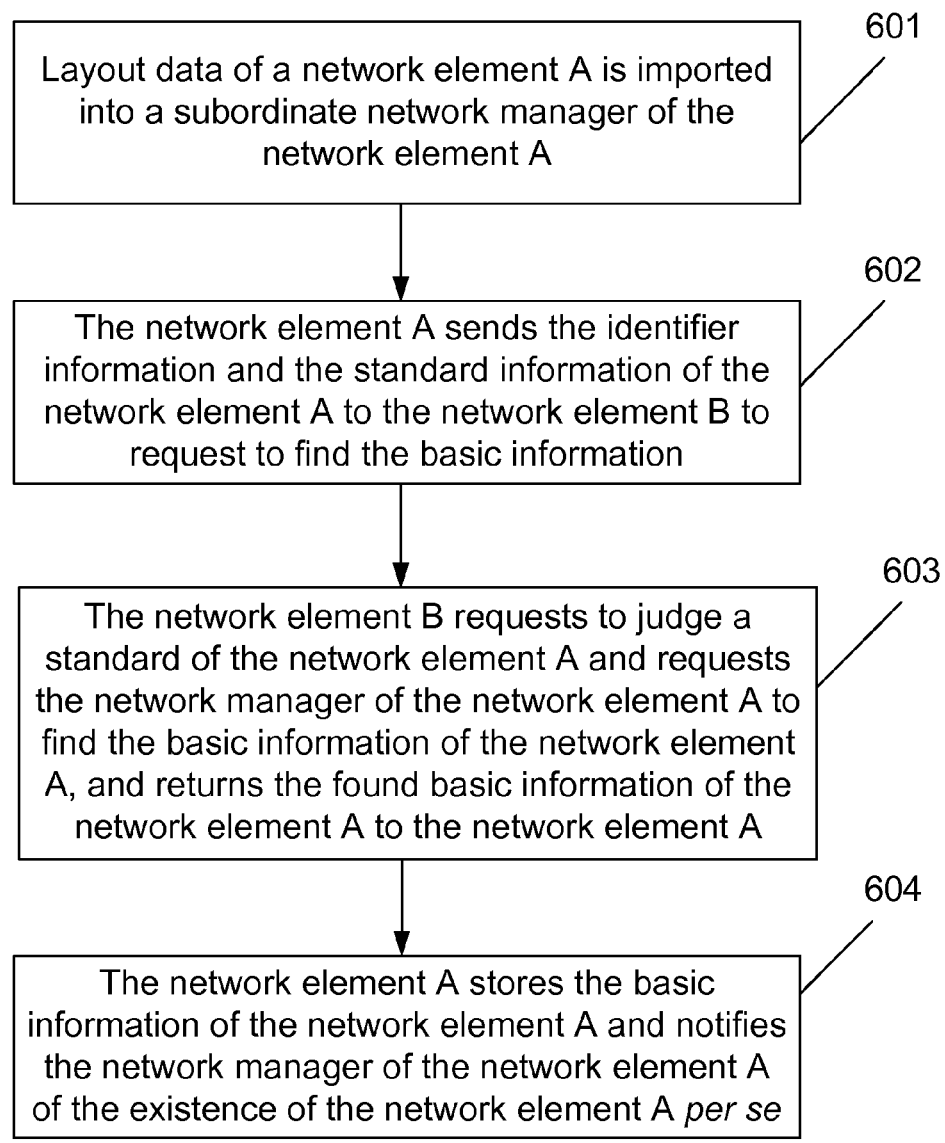
FIG. 6 is a process diagram showing a method of a second method embodiment of the disclosure.
Figure 7:
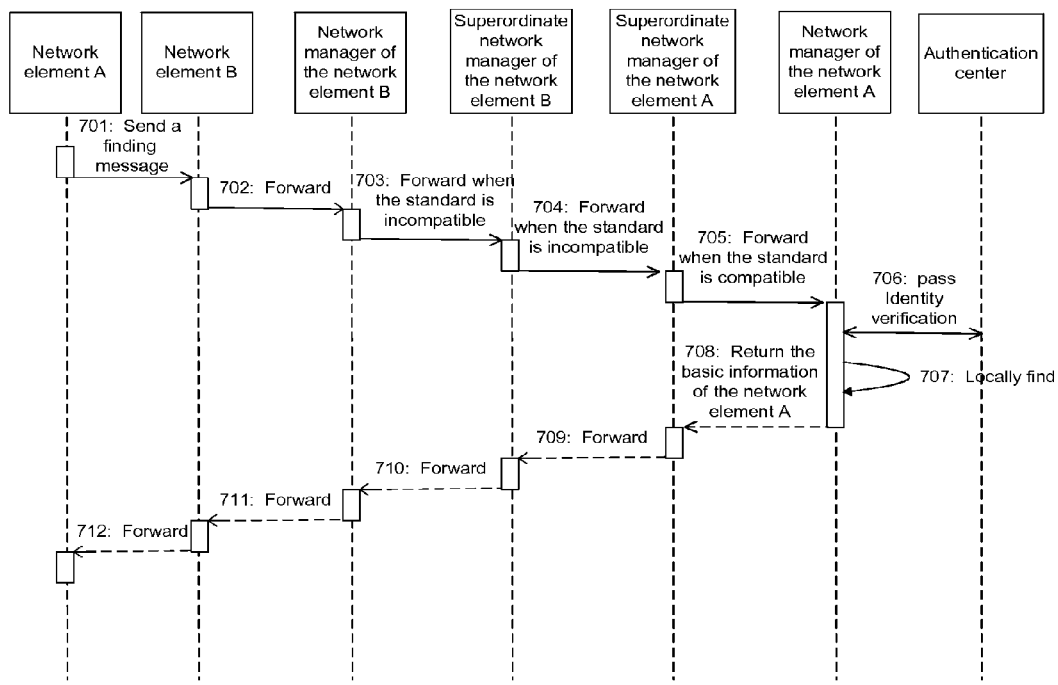
FIG. 7 is a process diagram showing an implementation way in which a network element B finds and feeds back the basic information of a network element A in the method of the second method embodiment of the disclosure.

As shown in FIG. 6, the self-discovery process of the LTE network element may include that:

Step 601: layout data of a network element is prepared; specifically, the layout data of the network element A is imported into a subordinate network manager of the network element A, wherein the layout data is generated by a network layout tool and includes identifier information and basic information of the network element A, where the identifier information of the network element A includes the CC board serial number or the identity information of the network element, and the basic information of the network element A includes an ID of the network element, an IP address of the network element, an IP address of the gateway, a subnet mask, and other configuration parameters;

Step 602: the network element A initiates a self-discovery process after being powered on; specifically, the network element A is powered on and sends a finding command to a network element A.RRU when discovering that there is neither an IP address of the network element A nor an IP address of the network manager to which the network element A belongs, wherein the parameters of the command are the identifier information (the CC board serial number or the identity information of the network element) of the network element A and standard information of the network element A; and the network element A.RRU sends a broadcast message by its antenna, wherein the broadcast message carries the identifier information (the CC board serial number or the identity information of the network element) and the standard information of the network element A;

Step 603: the network element B receives the broadcast message carrying the identifier information (the CC board serial number or the identity information of the network element) and the standard information of the network element A, determines a standard of the network element A, requests a network manager of the network element A to find the basic information of the network element A according to the identifier information (the CC board serial number or the identity information of the network element) and the standard information of the network element A, and returns to the network element A the basic information of the network element A found by the network manager of the network element A, where the specific process is shown in FIG. 7 and will be elaborated hereinafter; and Step 604: the network element A receives the basic information of the network element A returned by the network element B, stores the basic information of the network element A, and notifies the network manager of the existence of the network element A per se.

only Step 603 is elaborated here, since Step 601, Step 602, and Step 604 are basically the same as Step 201, Step 202, and Step 204 in the first embodiment.

FIG. 7 is a process diagram showing Step 603, i.e., a way of implementation in which the network element B finds and feeds back the basic information of the network element A, wherein since the network manager of the network element B and the subordinate network manager where the imported layout data of the network element A are may not be the same one, and their respective superordinate network managers may not be the same one either, the network manager of the network element B needs to find the basic information of the network element A from the network manager of the network element A via a superordinate network manager of the network element B and a superordinate network manager of the network element A, wherein finding and feeding back, by the network element B, the basic information of the network element A may specifically include that:

Step 701: an antenna of the network element B receives a finding message for finding the basic information of the network element A, wherein the finding message carries identifier information (CC board serial number or identity information of the network element) and standard information of the network element A;

Step 702: the network element B forwards the finding message to the network manager of the network element B;

Step 703: the network manager of the network element B determines, according to the standard information of the network element A in the finding message, that the standard of the network element A is incompatible, i.e., the network manager of the network element B is unable to manage a network element of such standard, and then forwards the finding message to the superordinate network manager of the network element B;

Step 704: the superordinate network manager of the network element B determines, according to the standard information of the network element A in the finding message, that the standard of the network element A is incompatible, i.e., the superordinate network manager of the network element B is unable to manage a network element of such standard, and then forwards the finding message to the superordinate network manager of the network element A;

Step 705: the superordinate network manager of network element A determines, according to the standard information of the network element A in the finding message, that the standard of the network element A is compatible, i.e., the superordinate network manager of the network element A is capable of managing a network element of such standard, and then forwards the finding message to the network manager of the network element A;

Step 706: the network manager of the network element A initiates an identity verification of the network element A with an authentication center; the next step is executed if the network element A passes the verification; otherwise the process is stopped;

Step 707: the subordinate network manager of the network element A locally finds the basic information of the network element A according to the identifier information (the CC board serial number or the identity information of the network element) of the network element A, wherein the basic information includes an ID of the network element, an IP address of the network element, an IP address of a gateway, a subnet mask, and an IP address of the network manager;

Step 708: the network manager of the network element A returns, after finding the basic information of the network element A from the imported layout data, the basic information of the network element A to the superordinate network manager of the network element A;

Step 709: the superordinate network manager of the network element A forwards the found basic information of the network element A to the superordinate network manager of the network element B;

Step 710: the superordinate network manager of the network element B forwards the found basic information of the network element A to the network manager of the network element B;

Step 711: the network manager of the network element B forwards the found basic information of the network element A to the network element B; and Step 712: the network element B forwards the found basic information of the network element A to the network element A.

It should be noted that, previously only one adjacent network element (the network element B) is taken as an example to describe the method of the embodiments of the disclosure for convenience of description; when a newly-established network element requests multiple adjacent network elements to perform a finding simultaneously, the newly-established network element will inevitably receive multiple messages carrying the basic information of the newly-established network element from the adjacent network elements, in which case the newly-established network element may select the message received first for processing.

The system of the disclosure will be elaborated in conjunction with FIG. 8 to FIG. 11 hereinafter.

Figure 8:
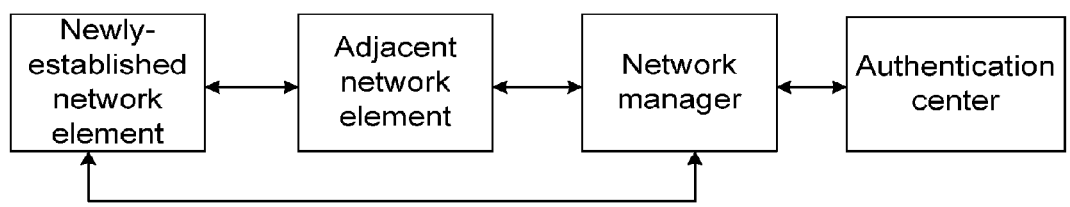
FIG. 8 is a schematic diagram showing a structure of a system for implementing self-discovery of network element of the disclosure.

As shown in FIG. 8, the system for implementing self-discovery of network element of the disclosure may include:

a network manager of a newly-established network element, the newly-established network element, an adjacent network element, and an authentication center, wherein the network manager of the newly-established network element is configured to store beforehand layout data imported therein and find basic information of the newly-established network element according to a request of the adjacent network element, wherein the layout data contains identifier information of the newly-established network element and the basic information of the newly-established network element;

the newly-established network element is configured to send, after being powered on, the identifier information of the newly-established network element to the adjacent network element and request to find the basic information of the newly-established network element; specifically, after being powered on and when determining that there is neither an IP address of the newly-established network element nor an IP address of the network manager to which the newly-established network element belongs, the newly-established network element sends to the adjacent network element a broadcast message carrying the identifier information of the newly-established network element and requests to find the basic information of the newly-established network element; the newly-established network element is further configured to store the basic information of the newly-established network element received from the adjacent network element and notify the network manager of the newly-established network element of the existence of the newly-established network element per se; and the adjacent network element is configured to request the network manager of the newly-established network element to find the basic information of the newly-established network element according to the identifier information of the newly-established network element, and return to the newly-established network element the basic information of the newly-established network element found by the network manager of the newly-established network element together with the identifier information of the newly-established network element.

In addition, the system of the disclosure further includes the authentication center in order to ensure security of a network; the network manager of the newly-established network element requests, before finding the basic information of the newly-established network element, the authentication center to verify the identity of the newly-established network element, and the authentication center verifies the identity of the newly-established network element and notifies, after the newly-established network element passes the verification, the network manager of the newly-established network element of the result that the newly-established network element passes the verification.

Since the newly-established network element and the adjacent network element may be of the same standard or of different standards, the system of the disclosure may fall into two categories according to the standard; in addition, since the implementation process of the authentication center has been elaborated in the forementioned method, and those skilled in the art can easily learn the function of the authentication center in the system according to the description of the forementioned method, the authentication center will not be elaborated any further in the system embodiment.

First System Embodiment the first embodiment mainly describes a scenario of a self-discovery process of a LTE network element with existence of an adjacent LTE network element of the same standard, where for convenience of description, the LTE network element that needs to be self-discovered is assumed to be a network element A and the existing adjacent LTE network element be a network element B.

Figure 9:
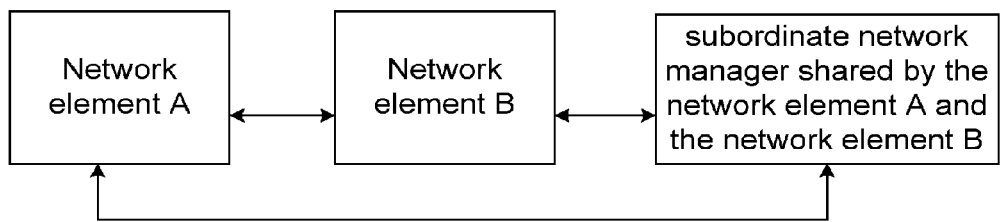
FIG. 9 is a schematic diagram showing a system structure when a newly-established network element and an adjacent network element belong to the same standard in a system of a first system embodiment of the disclosure.

FIG. 9 is a schematic diagram showing a system structure when a newly-established network element and an adjacent network element belong to the same standard;

wherein when the newly-established network element and the adjacent network element have the same subordinate network manager, the system may specifically include: a network manager of the network element A (i.e., a common subordinate network manager of the network element A and the network element B), the network element A, and the network element B, wherein the network manager of the network element A is configured to store beforehand layout data imported therein, wherein the layout data may be generated by a network layout tool and contains identifier information and basic information of the network element A, where the identifier information of the network element A includes a CC board serial number or identity information of the network element, and the basic information of the network element A includes an ID of the network element, an IP address of the network element, an IP address of a gateway, a subnet mask, and other configuration parameter;

the network element A is configured to send, after being powered on, to the network element B the identifier information of the network element A carried in a broadcast message and request to find the basic information of the network element A, and the network element A is further configured to store the basic information of the network element A received from the network element B and notify the network manager of the network element A of the existence of the network element A per se; and the network element B is configured to request the network manager of the network element A to find the basic information of the network element A according to the identifier information of the network element A, and return to the network element A the basic information of the network element A found by the network manager of the network element A together with the identifier information of the network element A.

Figure 10:
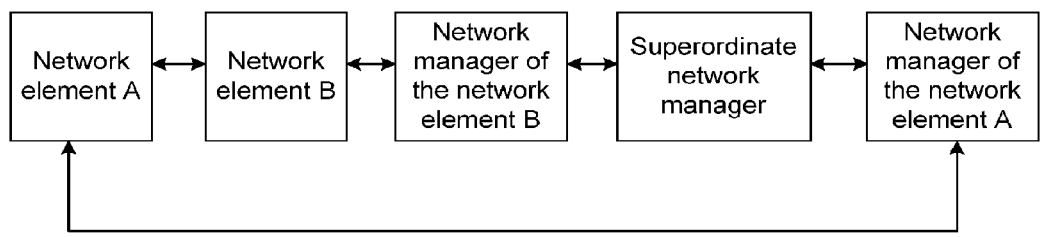
FIG. 10 is a schematic diagram showing another system structure when the newly-established network element and the adjacent network element belong to the same standard in the system of the first system embodiment of the disclosure.

FIG. 10 is a schematic diagram showing another system structure when a newly-established network element and an adjacent network element belong to the same standard, wherein when the network manager of the newly-established network element and that of the adjacent network element do not belong to the same subordinate network manager but have the same superordinate network manager, the system may specifically include: the network element A, a network manager of the network element A, the network element B, a network manager of the network element B, and a common superordinate network manager of the network element A and the network element B, wherein the network manager of the network element A is configured to store beforehand layout data of the network element A imported therein, wherein the layout data contains identifier information of the newly-established network element and basic information of the newly-established network element, and the network manager of the network element A is further configured to return the locally found basic information of the network element A to the superordinate network manager according to a finding request of the superordinate network manager;

the network element A is configured to send after being powered on, the identifier information of the network element A to the adjacent network element and request to find the basic information of the network element A, and the network element A is further configured to store the basic information of the network element A received from the network element B and notify the network manager of the network element A of the existence of the network element A per se;

the network element B is configured to send the identifier information of the network element A to the network manager of the network element B, request to find the basic information of the network element A, and return to the network element A the basic information of the network element A returned by the network manager of the network element B together with the identifier information of the network element A;

the network manager of the network element B is configured to report the finding request to the common superordinate network manager of the network element A and the network element B after failing to find the basic information of the network element A, and forward to the network element B the basic information of the network element A returned by the common superordinate network manager of the network element A and the network element B; and the common superordinate network manager of the network element A and the network element B is configured to distribute the identifier information of the network element A to all subordinate network managers administrated by the common superordinate network manager of the network element A and the network element B, request each subordinate network manager to find the basic information of the network element A, receive the basic information of the network element A returned by the network manager of the network element A, and return the received basic information of the network element A to the network manager of the network element B.

Second System Embodiment the second system embodiment mainly describes a scenario of a self-discovery process of a LTE network element without any LTE adjacent network element but with existence of an adjacent network element of another standard; what is different from the first embodiment is that parameters of a finding command here should also include standard information of the newly-established network element besides the existing identifier information (the CC board serial number or the identity information of the network element). Here, for convenience of description, the LTE network element that needs to be self-discovered is still assumed to be a network element A and the existing adjacent LTE network element of another standard be a network element B.

Figure 11:
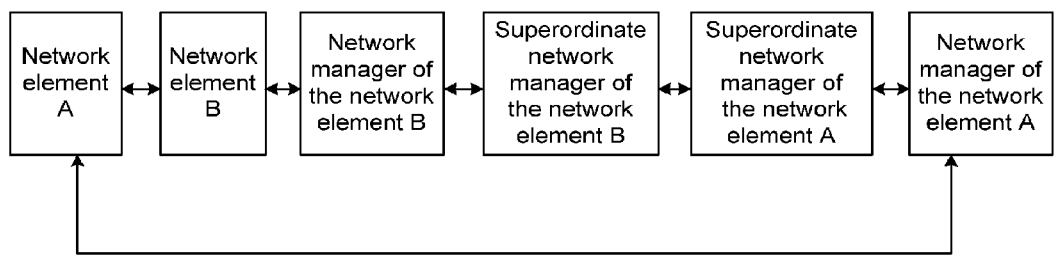
FIG. 11 is a schematic diagram showing a system structure when a newly-established network element and an adjacent network element belong to different standards in a system of a second system embodiment of the disclosure.

FIG. 11 is a schematic diagram showing a system structure when a newly-established network element and an adjacent network element belong to different standards, where when the network element A and the network element B are of different standards, the system may specifically include: a network manager of the network element A, the network element A, the network element B, a network manager of network element B, an superordinate network manager of the network element B, and an superordinate network manager of the network element A, wherein the network element A is configured to send, after being powered on, identifier information and standard information of the network element A to the adjacent network element and request to find the basic information of the network element A, and the network element A is further configured to store the basic information of the network element A received from the network element B and notify the network manager of the network element A of the existence of the network element A per se;

the network element B is configured to receive the identifier information and the standard information of the network element A sent by the network element A via radio, forward the identifier information and the standard information of the network element A to the network manager of the network element B, and return to the network element A via radio the returned basic information of the network element A together with the identifier information of the network element A;

the network manager of the network element B is configured to forward the identifier information and the standard information of the network element A to the superordinate network manager of the network element B when determining that the standard of the network element A is incompatible according to the standard information of the network element A;

the superordinate network manager of the network element B is configured to forward the identifier information and the standard information of the network element A to the superordinate network manager of the network element A when determining that the standard of the network element A is incompatible according to the standard information of the network element A;

the superordinate network manager of the network element A is configured to forward the identifier information of the network element A to the network manager of the network element A when determining that the standard of the network element A is compatible according to the standard information of the network element A; and the network manager of the network element A is configured to store beforehand layout data of the network element A imported therein, wherein the layout data contains the identifier information of the network element A and the basic information of the network element A; the network manager of the network element A is further configured to locally find the basic information of the network element A according to the identifier information of the network element and forward the found basic information of the network element A to the network element B sequentially through the superordinate network manager of the network element A, the superordinate network manager of the network element B and the network manager of the network element B.

To sum up, the disclosure provides the method and the system for implementing self-discovery of network element, where work needs not to be done simultaneously at both a base station side and a network manager side during the establishment of the base station so as to avoid the trouble of travelling between two places when establishing the base station; the parameter configuration process is automatically done by the network manager without any need of human interference so as to avoid complexity and error-prone property of manual configuration; and the elaborate way of configuration via DHCP which is both very vulnerable and highly risky is discarded.

The above are only preferred embodiments of the disclosure, but the scope of protection of the disclosure is not limited to these embodiments. Those skilled in the art can readily make various variations or replacements within the technical scope of the disclosure, and such variations and replacements shall fall within the scope of protection of the disclosure. Therefore, the scope of protection of the disclosure shall fall within the scope of protection defined by the claims.

What is claimed is:

1. A method for implementing self-discovery of network element, comprising:

step A: importing layout data of a newly-established network element to a network manager of the newly-established network element, wherein the layout data contains identifier information of the newly-established network element and basic information of the newly-established network element;

step B: sending, by the newly-established network element, after the newly-established network element is powered on, the identifier information of the newly-established network element to one or more adjacent network elements and requesting to find the basic information of the newly-established network element; and step C: requesting, by one adjacent network element of the one or more adjacent network elements, according to the identifier information of the newly-established network element, the network manager of the newly-established network element to find the basic information of the newly-established network element, and sending back to the newly-established network element the basic information of the newly-established network element found by the network manager of the newly-established network element together with the identifier information of the newly-established network element.

2. The method for implementing self-discovery of network element according to claim 1, further comprising:

storing, by the newly-established network element, the basic information of the newly-established network element sent from the adjacent network element and notifying the network manager of the newly-established network element of existence of the newly-established network element per se.

3. The method for implementing self-discovery of network element according to claim 2, wherein the step C further comprises:

requesting, by the network manager of the newly-established network element, an authentication center to perform identity verification on the newly-established network element, and finding the basic information of the newly-established network element after the newly-established network element passes the verification.

4. The method for implementing self-discovery of network element according to claim 2, wherein the step C comprises, when the adjacent network element and the newly-established network element are of a same standard, and an network manager of the adjacent network element and the network manager of the newly-established network element belong to a same subordinate network manager:

receiving, by the adjacent network element, the identifier information of the newly-established network element sent by the newly-established network element via radio, performing a finding operation in a subordinate network manager shared by the newly-established network element and the adjacent network element according to the identifier information of the newly-established network element, sending back to the newly-established network element via radio the found basic information of the newly-established network element together with the identifier information of the newly-established network element; or, the step C comprises, when the adjacent network element and the newly-established network element are of the same standard, and the network manager of the adjacent network element and the network manager of the newly-established network element do not belong to the same subordinate network manager but have a same superordinate network manager:

receiving, by the adjacent network element, the identifier information of the newly-established network element sent by the newly-established network element via radio, and requesting, sequentially via the network manager of the adjacent network element and via the superordinate network manager shared by the newly-established network element and the adjacent network element, the network manager of the newly-established network element to find the basic information of the newly-established network element according to the identifier information of the newly-established network element;

finding, by the network manager of the newly-established network element, the basic information of the newly-established network element according to the identifier information of the newly-established network element, and sending, sequentially via the superordinate network manager shared by the newly-established network element and the adjacent network element and via the network manager of the adjacent network element, back to the adjacent network element the found basic information of the newly-established network element; and sending, by the adjacent network element, back to the newly-established network element the found basic information of the newly-established network element together with the identifier information of the newly-established network element.

5. The method for implementing self-discovery of network element according to claim 2, wherein the step B further comprises, when the adjacent network element and the newly-established network element are of different standards:

sending, by the newly-established network element, its standard information together with its identifier information to the adjacent network element.

6. The method for implementing self-discovery of network element according to claim 5, wherein the step C comprises:

forwarding, by the adjacent network element, to the network manager of the adjacent network element the received identifier information and standard information of the newly-established network element sent by the newly-established network element via radio;

forwarding, sequentially by the network manager of the adjacent network element and by an superordinate network manager of the adjacent network element, the identifier information and standard information of the newly-established network element to an superordinate network manager of the newly-established network element when determining that the standard of the newly-established network element is incompatible according to the standard information of the newly-established network element;

forwarding, by the superordinate network manager of the newly-established network element, the identifier information of the newly-established network element to the network manager of the newly-established network element when determining that the standard of the newly-established network element is compatible according to the standard information of the newly-established network element;

locally finding, by the network manager of the newly-established network element, the basic information of the newly-established network element according to the identifier information of the newly-established network element, and forwarding, sequentially via the superordinate network manager of the newly-established network element, the superordinate network manager of the adjacent network element, and the network manager of the adjacent network element, the found basic information of the newly-established network element to the adjacent network element; and sending, by the adjacent network element via radio, back to the newly-established network element the basic information of the newly-established network element sent back by the network manager of the newly-established network element together with the identifier information of the newly-established network element.

7. The method for implementing self-discovery of network element according to claim 2, wherein the identifier information of the newly-established network element comprises a CC board serial number of the newly-established network element or identity information of the newly-established network element.

8. The method for implementing self-discovery of network element according to claim 1, wherein the step B comprises:

sending, by the newly-established network element after the newly-established network element is powered on, the identifier information of the newly-established network element that is carried in a broadcast message, to the one or more adjacent network elements and requesting to find the basic information of the newly-established network element when the newly-established network element finds that there is neither an IP address of the newly-established network element nor an IP address of the network manager to which the newly-established network element belongs.

9. The method for implementing self-discovery of network element according to claim 8, wherein the step C further comprises:

requesting, by the network manager of the newly-established network element, an authentication center to perform identity verification on the newly-established network element, and finding the basic information of the newly-established network element after the newly-established network element passes the verification.

10. The method for implementing self-discovery of network element according to claim 8, wherein the step C comprises, when the adjacent network element and the newly-established network element are of a same standard, and an network manager of the adjacent network element and the network manager of the newly-established network element belong to a same subordinate network manager:

receiving, by the adjacent network element, the identifier information of the newly-established network element sent by the newly-established network element via radio, performing a finding operation in a subordinate network manager shared by the newly-established network element and the adjacent network element according to the identifier information of the newly-established network element, sending back to the newly-established network element via radio the found basic information of the newly-established network element together with the identifier information of the newly-established network element; or, the step C comprises, when the adjacent network element and the newly-established network element are of the same standard, and the network manager of the adjacent network element and the network manager of the newly-established network element do not belong to the same subordinate network manager but have a same superordinate network manager:
  receiving, by the adjacent network element, the identifier information of the newly-established network element sent by the newly-established network element via radio, and requesting, sequentially via the network manager of the adjacent network element and via the superordinate network manager shared by the newly-established network element and the adjacent network element, the network manager of the newly-established network element to find the basic information of the newly-established network element according to the identifier information of the newly-established network element;
  finding, by the network manager of the newly-established network element, the basic information of the newly-established network element according to the identifier information of the newly-established network element, and sending, sequentially via the superordinate network manager shared by the newly-established network element and the adjacent network element and via the network manager of the adjacent network element, back to the adjacent network element the found basic information of the newly-established network element; and
  sending, by the adjacent network element, back to the newly-established network element the found basic information of the newly-established network element together with the identifier information of the newly-established network element.

11. The method for implementing self-discovery of network element according to claim 8, wherein the step B further comprises, when the adjacent network element and the newly-established network element are of different standards:
  sending, by the newly-established network element, its standard information together with its identifier information to the adjacent network element.

12. The method for implementing self-discovery of network element according to claim 11, wherein the step C comprises:
  forwarding, by the adjacent network element, to the network manager of the adjacent network element the received identifier information and standard information of the newly-established network element sent by the newly-established network element via radio;
  forwarding, sequentially by the network manager of the adjacent network element and by an superordinate network manager of the adjacent network element, the identifier information and standard information of the newly-established network element to an superordinate network manager of the newly-established network element when determining that the standard of the newly-established network element is incompatible according to the standard information of the newly-established network element;
  forwarding, by the superordinate network manager of the newly-established network element, the identifier information of the newly-established network element to the network manager of the newly-established network element when determining that the standard of the newly-established network element is compatible according to the standard information of the newly-established network element;
  locally finding, by the network manager of the newly-established network element, the basic information of the newly-established network element according to the identifier information of the newly-established network element, and forwarding, sequentially via the superordinate network manager of the newly-established network element, the superordinate network manager of the adjacent network element, and the network manager of the adjacent network element, the found basic information of the newly-established network element to the adjacent network element; and
  sending, by the adjacent network element via radio, back to the newly-established network element the basic information of the newly-established network element sent back by the network manager of the newly-established network element together with the identifier information of the newly-established network element.

13. The method for implementing self-discovery of network element according to claim 8, wherein the identifier information of the newly-established network element comprises a CC board serial number of the newly-established network element or identity information of the newly-established network element.

14. The method for implementing self-discovery of network element according to claim 1, wherein the step C further comprises:
  requesting, by the network manager of the newly-established network element, an authentication center to perform identity verification on the newly-established network element, and finding the basic information of the newly-established network element after the newly-established network element passes the verification.

15. The method for implementing self-discovery of network element according to claim 1, wherein the step C comprises, when the adjacent network element and the newly-established network element are of a same standard, and an network manager of the adjacent network element and the network manager of the newly-established network element belong to a same subordinate network manager:
  receiving, by the adjacent network element, the identifier information of the newly-established network element sent by the newly-established network element via radio, performing a finding operation in a subordinate network manager shared by the newly-established network element and the adjacent network element according to the identifier information of the newly-established network element, sending back to the newly-established network element via radio the found basic information of the newly-established network element together with the identifier information of the newly-established network element; or,
  the step C comprises, when the adjacent network element and the newly-established network element are of the same standard, and the network manager of the adjacent network element and the network manager of the newly-established network element do not belong to the same subordinate network manager but have a same superordinate network manager:
  receiving, by the adjacent network element, the identifier information of the newly-established network element sent by the newly-established network element via radio, and requesting, sequentially via the network manager of the adjacent network element and via the superordinate network manager shared by the newly-established network element and the adjacent network element, the network manager of the newly-established network element to find the basic information of the newly-established network element according to the identifier information of the newly-established network element;

finding, by the network manager of the newly-established network element, the basic information of the newly-established network element according to the identifier information of the newly-established network element, and sending, sequentially via the superordinate network manager shared by the newly-established network element and the adjacent network element and via the network manager of the adjacent network element, back to the adjacent network element the found basic information of the newly-established network element; and sending, by the adjacent network element, back to the newly-established network element the found basic information of the newly-established network element together with the identifier information of the newly-established network element.

16. The method for implementing self-discovery of network element according to claim 1, wherein the step B further comprises, when the adjacent network element and the newly-established network element are of different standards:

sending, by the newly-established network element, its standard information together with its identifier information to the adjacent network element.

17. The method for implementing self-discovery of network element according to claim 16, wherein the step C comprises:

forwarding, by the adjacent network element, to the network manager of the adjacent network element the received identifier information and standard information of the newly-established network element sent by the newly-established network element via radio;

forwarding, sequentially by the network manager of the adjacent network element and by an superordinate network manager of the adjacent network element, the identifier information and standard information of the newly-established network element to an superordinate network manager of the newly-established network element when determining that the standard of the newly-established network element is incompatible according to the standard information of the newly-established network element;

forwarding, by the superordinate network manager of the newly-established network element, the identifier information of the newly-established network element to the network manager of the newly-established network element when determining that the standard of the newly-established network element is compatible according to the standard information of the newly-established network element;

locally finding, by the network manager of the newly-established network element, the basic information of the newly-established network element according to the identifier information of the newly-established network element, and forwarding, sequentially via the superordinate network manager of the newly-established network element, the superordinate network manager of the adjacent network element, and the network manager of the adjacent network element, the found basic information of the newly-established network element to the adjacent network element; and sending, by the adjacent network element via radio, back to the newly-established network element the basic information of the newly-established network element sent back by the network manager of the newly-established network element together with the identifier information of the newly-established network element.

18. The method for implementing self-discovery of network element according to claim 1, wherein the identifier information of the newly-established network element comprises a CC board serial number of the newly-established network element or identity information of the newly-established network element.

19. A system for implementing self-discovery of network element, comprising: a network manager of a newly-established network element, the newly-established network element, and one or more adjacent network elements, wherein the network manager of the newly-established network element is configured to store beforehand layout data imported therein and find basic information of the newly-established network element according to a request from one adjacent network element of the one or more adjacent network elements, wherein the layout data contains identifier information of the newly-established network element and the basic information of the newly-established network element;

the newly-established network element is configured to send, after being powered on, the identifier information of the newly-established network element to the one or more adjacent network elements to request to find the basic information of the newly-established network element; and the adjacent network element is configured to request the network manager of the newly-established network element to find the basic information of the newly-established network element according to the identifier information of the newly-established network element, and send back to the newly-established network element the basic information of the newly-established network element found by the network manager of the newly-established network element together with the identifier information of the newly-established network element.

20. The system for implementing self-discovery of network element according to claim 19, wherein the newly-established network element is further configured to store the basic information of the newly-established network element received from the adjacent network element and notify the network manager of the newly-established network element of existence of the newly-established network element per se.

21. The system for implementing self-discovery of network element according to claim 20, further comprising:

an authentication center configured to perform identity verification on the newly-established network element according to a request from the network manager of the newly-established network element and notify the network manager of the newly-established network element after the newly-established network element passes the verification.

22. The system for implementing self-discovery of network element according to claim 20, wherein when the adjacent network element and the newly-established network element are of a same standard, and an network manager of the adjacent network element and the network manager of the newly-established network element belong to a same subordinate network manager, the adjacent network element is configured to perform, after receiving the identifier information of the newly-established network element sent by the newly-established network element via radio, a finding operation in the network manager of the newly-established network element according to the identifier information of the newly-established network element, and send back to the newly-established network element via radio the found basic information of the newly-established network element together with the identifier information of the newly-established network element; or, when the adjacent network element and the newly-established network element are of the same standard, and the network manager of the adjacent network element and the network manager of the newly-established network element do not belong to the same subordinate network manager but have a same superordinate network manager, the system further comprises the superordinate network manager shared by the newly-established network element and the adjacent network element, wherein the adjacent network element is configured to request, sequentially via the network manager of the adjacent network element and via the superordinate network manager shared by the newly-established network element and the adjacent network element, the network manager of the newly-established network element to find the basic information of the newly-established network element according to the identifier information of the newly-established network element after receiving the identifier information of the newly-established network element sent by the newly-established network element via radio, and send back to the newly-established network element via radio the basic information of the newly-established network element sent back by the network manager of the newly-established network element together with the identifier information of the newly-established network element; and the network manager of the newly-established network element is configured to send, after finding the basic information of the newly-established network element according to the identifier information of the newly-established network element, sequentially via the superordinate network manager and the network manager of the adjacent network element, back to the adjacent network element the found basic information of the newly-established network element.

23. The system for implementing self-discovery of network element according to claim 20, wherein when the adjacent network element and the newly-established network element are of different standards, the newly-established network element is configured to send its own standard information together with its own identifier information to the adjacent network element.

24. The system for implementing self-discovery of network element according to claim 23, wherein when the adjacent network element and the newly-established network element are of different standards, the system further comprises a superordinate network manager of the adjacent network element and a superordinate network manager of the newly-established network element, wherein the adjacent network element is configured to forward, after receiving the identifier information and the standard information of the newly-established network element sent by the newly-established network element via radio, the identifier information and the standard information of the newly-established network element to the network manager of the adjacent network element, and send back to the newly-established network element via radio the basic information of the newly-established network element sent by the network manager of the newly-established network element together with the identifier information of the newly-established network element;

the network manager of the adjacent network element and the superordinate network manager of the adjacent network element are configured to sequentially forward the identifier information and the standard information of the newly-established network element to the superordinate network manager of the newly-established network element when determining that the standard of the newly-established network element is incompatible according to the standard information of the newly-established network element;

the superordinate network manager of the newly-established network element is configured to forward the identifier information of the newly-established network element to the network manager of the newly-established network element when determining that the standard of the newly-established network element is compatible according to the standard information of the newly-established network element; and the network manager of the newly-established network element is configured to locally find the basic information of the newly-established network element according to the identifier information of the newly-established network element, and forward, sequentially via the superordinate network manager of the newly-established network element, the superordinate network manager of the adjacent network element, and the network manager of the adjacent network element, the found basic information of the newly-established network element to the adjacent network element.

25. The system for implementing self-discovery of network element according to claim 19, wherein the newly-established network element is configured to send, after being powered on, the identifier information of the newly-established network element carried in a broadcast message to the one or more adjacent network elements and request to find the basic information of the newly-established network element when determining that there is neither an IP address of the newly-established network element nor an IP address of the network manager to which the newly-established network element belongs.

26. The system for implementing self-discovery of network element according to claim 25, further comprising:

an authentication center configured to perform identity verification on the newly-established network element according to a request from the network manager of the newly-established network element and notify the network manager of the newly-established network element after the newly-established network element passes the verification.

27. The system for implementing self-discovery of network element according to claim 25, wherein when the adjacent network element and the newly-established network element are of a same standard, and an network manager of the adjacent network element and the network manager of the newly-established network element belong to a same subordinate network manager, the adjacent network element is configured to perform, after receiving the identifier information of the newly-established network element sent by the newly-established network element via radio, a finding operation in the network manager of the newly-established network element according to the identifier information of the newly-established network element, and send back to the newly-established network element via radio the found basic information of the newly-established network element together with the identifier information of the newly-established network element; or, when the adjacent network element and the newly-established network element are of the same standard, and the network manager of the adjacent network element and the network manager of the newly-established network element do not belong to the same subordinate network manager but have a same superordinate network manager, the system further comprises the superordinate network manager shared by the newly-established network element and the adjacent network element, wherein the adjacent network element is configured to request, sequentially via the network manager of the adjacent network element and via the superordinate network manager shared by the newly-established network element and the adjacent network element, the network manager of the newly-established network element to find the basic information of the newly-established network element according to the identifier information of the newly-established network element after receiving the identifier information of the newly-established network element sent by the newly-established network element via radio, and send back to the newly-established network element via radio the basic information of the newly-established network element sent back by the network manager of the newly-established network element together with the identifier information of the newly-established network element; and the network manager of the newly-established network element is configured to send, after finding the basic information of the newly-established network element according to the identifier information of the newly-established network element, sequentially via the superordinate network manager and the network manager of the adjacent network element, back to the adjacent network element the found basic information of the newly-established network element.

28. The system for implementing self-discovery of network element according to claim 25, wherein when the adjacent network element and the newly-established network element are of different standards, the newly-established network element is configured to send its own standard information together with its own identifier information to the adjacent network element.

29. The system for implementing self-discovery of network element according to claim 28, wherein when the adjacent network element and the newly-established network element are of different standards, the system further comprises a superordinate network manager of the adjacent network element and a superordinate network manager of the newly-established network element, wherein the adjacent network element is configured to forward, after receiving the identifier information and the standard information of the newly-established network element sent by the newly-established network element via radio, the identifier information and the standard information of the newly-established network element to the network manager of the adjacent network element, and send back to the newly-established network element via radio the basic information of the newly-established network element sent by the network manager of the newly-established network element together with the identifier information of the newly-established network element;

the network manager of the adjacent network element and the superordinate network manager of the adjacent network element are configured to sequentially forward the identifier information and the standard information of the newly-established network element to the superordinate network manager of the newly-established network element when determining that the standard of the newly-established network element is incompatible according to the standard information of the newly-established network element;

the superordinate network manager of the newly-established network element is configured to forward the identifier information of the newly-established network element to the network manager of the newly-established network element when determining that the standard of the newly-established network element is compatible according to the standard information of the newly-established network element; and the network manager of the newly-established network element is configured to locally find the basic information of the newly-established network element according to the identifier information of the newly-established network element, and forward, sequentially via the superordinate network manager of the newly-established network element, the superordinate network manager of the adjacent network element, and the network manager of the adjacent network element, the found basic information of the newly-established network element to the adjacent network element.

30. The system for implementing self-discovery of network element according to claim 19, further comprising:
an authentication center configured to perform identity verification on the newly-established network element according to a request from the network manager of the newly-established network element and notify the network manager of the newly-established network element after the newly-established network element passes the verification.

31. The system for implementing self-discovery of network element according to claim 19, wherein when the adjacent network element and the newly-established network element are of a same standard, and an network manager of the adjacent network element and the network manager of the newly-established network element belong to a same subordinate network manager, the adjacent network element is configured to perform, after receiving the identifier information of the newly-established network element sent by the newly-established network element via radio, a finding operation in the network manager of the newly-established network element according to the identifier information of the newly-established network element, and send back to the newly-established network element via radio the found basic information of the newly-established network element together with the identifier information of the newly-established network element; or, when the adjacent network element and the newly-established network element are of the same standard, and the network manager of the adjacent network element and the network manager of the newly-established network element do not belong to the same subordinate network manager but have a same superordinate network manager, the system further comprises the superordinate network manager shared by the newly-established network element and the adjacent network element, wherein the adjacent network element is configured to request, sequentially via the network manager of the adjacent network element and via the superordinate network manager shared by the newly-established network element and the adjacent network element, the network manager of the newly-established network element to find the basic information of the newly-established network element according to the identifier information of the newly-established network element after receiving the identifier information of the newly-established network element sent by the newly-established network element via radio, and send back to the newly-established network element via radio the basic information of the newly-established network element sent back by the network manager of the newly-established network element together with the identifier information of the newly-established network element; and the network manager of the newly-established network element is configured to send, after finding the basic information of the newly-established network element according to the identifier information of the newly-established network element, sequentially via the superordinate network manager and the network manager of the adjacent network element, back to the adjacent network element the found basic information of the newly-established network element.

32. The system for implementing self-discovery of network element according to claim 19, wherein when the adjacent network element and the newly-established network element are of different standards, the newly-established network element is configured to send its own standard information together with its own identifier information to the adjacent network element.

33. The system for implementing self-discovery of network element according to claim 32, wherein when the adjacent network element and the newly-established network element are of different standards, the system further comprises a superordinate network manager of the adjacent network element and a superordinate network manager of the newly-established network element, wherein the adjacent network element is configured to forward, after receiving the identifier information and the standard information of the newly-established network element sent by the newly-established network element via radio, the identifier information and the standard information of the newly-established network element to the network manager of the adjacent network element, and send back to the newly-established network element via radio the basic information of the newly-established network element sent by the network manager of the newly-established network element together with the identifier information of the newly-established network element;

the network manager of the adjacent network element and the superordinate network manager of the adjacent network element are configured to sequentially forward the identifier information and the standard information of the newly-established network element to the superordinate network manager of the newly-established network element when determining that the standard of the newly-established network element is incompatible according to the standard information of the newly-established network element;

the superordinate network manager of the newly-established network element is configured to forward the identifier information of the newly-established network element to the network manager of the newly-established network element when determining that the standard of the newly-established network element is compatible according to the standard information of the newly-established network element; and the network manager of the newly-established network element is configured to locally find the basic information of the newly-established network element according to the identifier information of the newly-established network element, and forward, sequentially via the superordinate network manager of the newly-established network element, the superordinate network manager of the adjacent network element, and the network manager of the adjacent network element, the found basic information of the newly-established network element to the adjacent network element.

\* \* \* \* \*